United States Patent [19]

King, Jr. et al.

[11] 3,838,427

[45] Sept. 24, 1974

[54] METHOD AND APPARATUS FOR DIGITALLY INDICATING DIRECT PRESENT POSITION

[75] Inventors: Edward J. King, Jr., Shawnee Mission; Kenneth R. Ganther, Jr., Lenexa; Ronald Eugene Grillot, Olathe, all of Kans.

[73] Assignee: King Raedio Corporation, Olathe, Kans.

[22] Filed: July 3, 1972

[21] Appl. No.: 268,561

[52] U.S. Cl. ............................ 343/106 R, 343/112 R
[51] Int. Cl. ................................................. G01s 1/44
[58] Field of Search ................... 343/106 R, 112 R; 235/150.27

[56] References Cited
UNITED STATES PATENTS
3,281,844  10/1966  Sabin ............................ 343/112 R
3,495,248   2/1970  Raether et al. ................ 343/106 R
3,644,928   2/1972  Wright ........................... 343/106 R
3,659,291   4/1972  Anthony ......................... 343/106 R Primary Examiner—Maynard R. Wilbur
Assistant Examiner—T. M. Blum
Attorney, Agent, or Firm—Lowe, Kokjer, Kircher et al

[57] ABSTRACT

A method and apparatus for assisting in the navigation of aircraft using VOR or area navigation (RNAV) information has a digital readout operating in conjunction with a course deviation indicator (CDI) otherwise known as a D-bar. A keyboard is provided to enable the pilot to digitally enter course selection numbers for either VOR or RNAV problems. The subject method and apparatus permits the pilot to merely push a button to immediately compute the required course to center the CDI D-bar and to automatically insert the computed number into the VOR or RNAV system.

4 Claims, 12 Drawing Figures

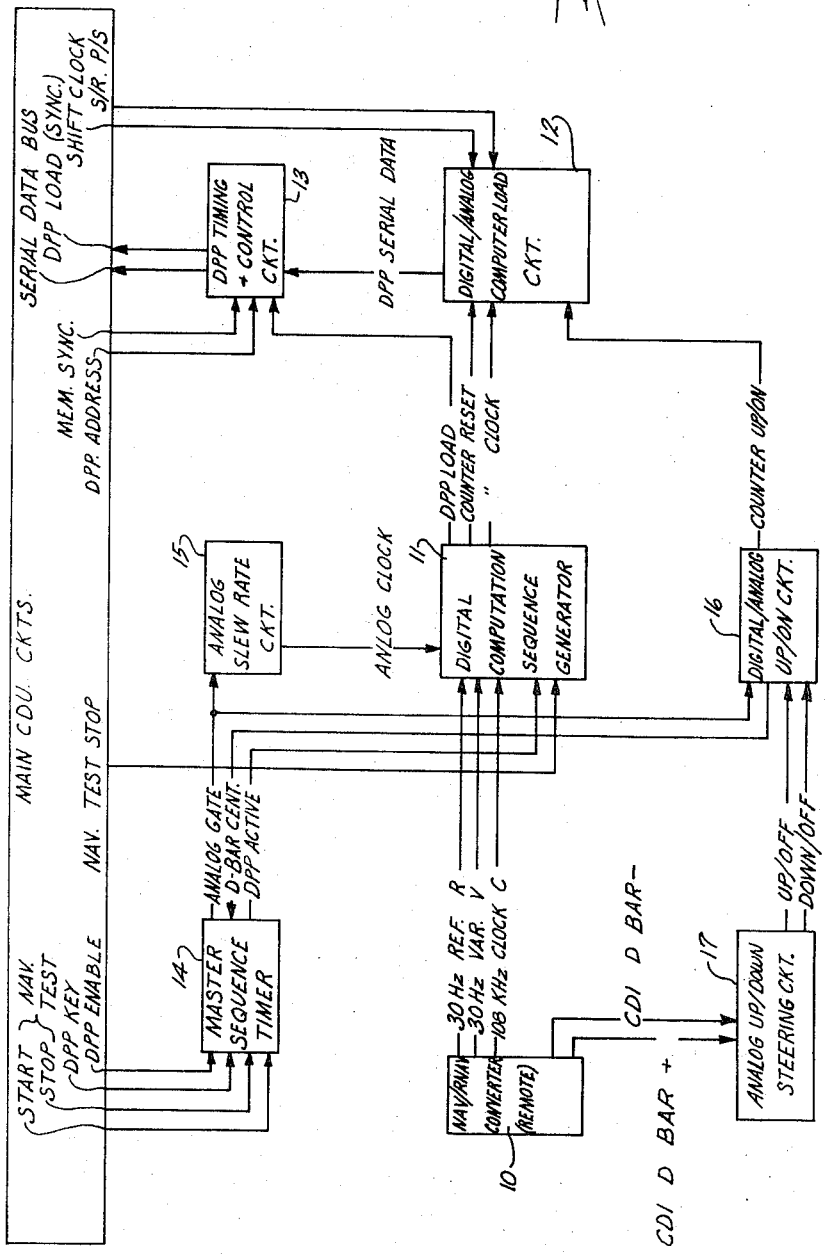
Fig. 4.
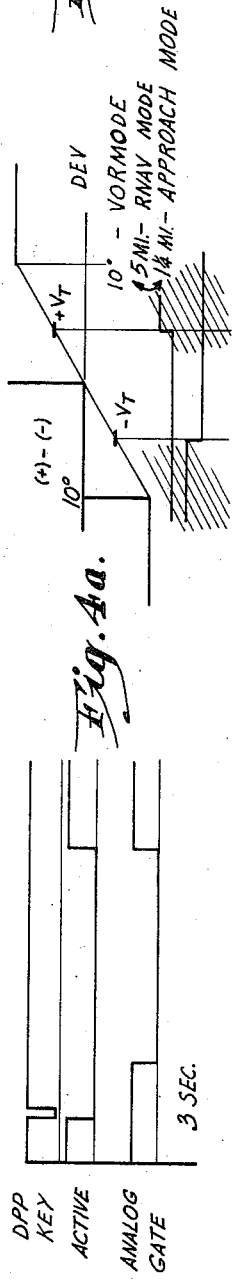
Fig. 4a.
Fig. 4b.

METHOD AND APPARATUS FOR DIGITALLY INDICATING DIRECT PRESENT POSITION

BACKGROUND AND BRIEF DESCRIPTION OF THE INVENTION

The subject invention is particularly applicable with conventional VOR/RNAV systems and is especially desirable for utilization with digitally operated VOR/RNAV systems.

Conventional VOR/RNAV systems require that the pilot rotate a knob while observing the course deviation indicator (CDI) bar. As the indicator bar comes off of the peg, a pilot will generally slow down the rate at which he is turning the knob and stops turning completely when the indicator bar is centered. In a digital system, a pilot must guess a number for the course that will hopefully center the bar and enter this estimated number into the system by way of a keyboard. If the number, which may be representative of a course to a VOR facility or way point is correct, the indicator bar will be centered. However, if the bar does not come off the peg, a new number will be entered that is an increase in the same direction over the previous number. If the indicator bar comes off the peg, and goes to the other side, a new number must be interpolated between the last two numbers and again entered in the keyboard. This process will be necessarily continued until a number which centers the needle is determined.

Quite obviously, the above process can be time consuming as well as involving mental calculations and pilot concentration. The subject invention will enable the pilot to merely push a button and circuitry, hereinafter identified as DPP circuitry (Direct Present Position and further identified by the trademark "AUTO COURSE" owned by the King Radio Corporation of Olathe, Kan.) computes the required course to center the CDI bar and automatically inserts this number into the VOR/RNAV system. Any residual error, within preset limits, is trimmed out (by the DPP circuit) by automatically adjusting the course number in the system.

It is well known that the conventional operation of a VOR facility includes the production of two 30 Hz signals so correlated that the phase relationship of same is a function of the aircraft location with respect to the VOR station. Also, a phantom waypoint will be designated by a similar type of signal information albeit the waypoint is geographically shifted to any desirable (within limits) location on or away from the actual VOR station.

As suggested above, one of the 30 Hz signals is utilized as a reference signal while the other 30 Hz signal is considered to be a variable phase signal. In actual practice, the 30 Hz reference phase is modulated up to a 9,960 Hz center frequency for transmission base and spectrum purposes. Accordingly, the ultimate baseband spectrum will consist of two distinct signals, that being a 30 Hz variable signal and a 9,960 Hz 30 Hz modulated FM reference phase signal. Further amplitude modulation occurs on an RF carrier of somewhere between 108 and 117 Mhz for atmospheric transmission. The VOR receiver demodulates the RF input and produces the base band spectrum of the VOR station. The input stage of the NAV converter then processes the base band spectrum of the VOR station into 3 usable signals; however first, the NAV converter separates the composite with two filters, one being centered at 30 Hz while the other is centered at 9,960 Hz. The 9,960 Hz signal is demodulated after is is filtered and converted back down to a 30 Hz signal which will correspond to the 30 Hz reference signal mentioned above. Then, the two 30 Hz signals whose phase difference describes the position of the aircraft relative to the VOR station is fed to a phase locked loop processor circuit. The phase locked loop processor circuit, in turn, has a three signal output which includes the 30 Hz variable signal (V), the 30 Hz reference signal (R), and a 108 Hz clock (C) all of which are square waves and used in the DPP circuitry.

When a unit is switched for operation in the VOR mode only, the indicators and the DPP circuit require that these three signals (V, R, and C) are applied directly to the DPP circuit itself. However, in the RNAV or in the en route mode, when the area NAC computer is engaged, these three signals are switched so that the DPP circuit receives same from the area NAV computer instead of the VOR convertor.

As shown in FIG. 1, the system interface includes the modulated RF signal being first received by the aircraft and delivered to the NAV (VOR) receiver. This receiver demodulates the VOR signal and transmits same to a NAV convertor. An RNAV computer, which receives information from a DME and also altitude information, receives the 30 Hz variable signal (V), the 30 Hz reference signal (R) and the 108 Khz clock signal (C) from the NAV converter and in turn generates information signals to the NAV converter corresponding to a phantom waypoint. The primary function of the RNAV computer is to compute a new variable phase signal without changing the reference phase signal or the clock (the latter two do not vary with the aircraft position). Accordingly, the RNAV computer performs all its calculations based on the VOR information, the DME distance input, the altitude inputs and in turn delivers a processed 30 cycle variable signal which will correspond to waypoint information.

A primary object of the invention is to provide a unique system for centering the course deviation indicator (CDI) bar when same is used with either VOR or waypoint navigation information.

Another object of the invention is to provide a unique system of the character described above which substantially reduces the effort previously required of a pilot during the various phases of navigation including periods of time that may call for extremely active and critical navigation. It is a feature of the invention that the system inherently provides for safer and more efficient aircraft operation than what has heretofore been utilized.

A further object of the invention is to provide a unique means for digitally selecting a desired course to either a VOR station or waypoint and to automatically center the course deviation indicator bar. It is a feature of the invention that all trial and error selection methods of correct course to either the waypoint or the VOR station have been eliminated thereby substantially reducing the pilot's workload and presenting valuable information to the pilot almost instantaneously.

A still further object of the invention is to provide a unique circuit for providing direct present position (DPP) information to a pilot for either VOR or waypoint navigation and to substantially increase the accuracy of the circuitry and associated indicating device. The invention has therefore substantially eliminated all moving parts, such as inductive resolvers, and therefore increased the operable lifetime and usability of the associated system.

A still further object of the invention is to provide a system and device of the character described which enables the digital determination of direct present position (DPP) and to substantially reduce the volume and weight of the entire system. Prior art devices generally utilized mechanical storage of all the parameters including mechanical waferswitches, timing drums for frequency, inductor resolvers for waypoint bearings and course variable potentiameters for distance, etc. The subject invention now has the facility for digitally storing a plurality of (at least 10) waypoints in substantially the same space as a maximum of two waypoints could heretofore be stored.

These and other objects of the invention, together with the features of novelty appurtenant thereto, will appear in the course of the following description.

DETAILED DESCRIPTION OF THE INVENTION

In the accompanying drawings which form a part of the specifications and are to be read in conjunction therewith, and in which like reference numerals indicate like parts in the various views;

FIG. 4 is a block diagram of the direct present position (DPP) circuitry;

FIG. 4a is a timing diagram showing the relationships between the DPP key, the DPP active line and the analog gate line;

FIG. 4b is a timing diagram showing the relationship of the D-bar deviation with the various operative modes;

Figure 1:
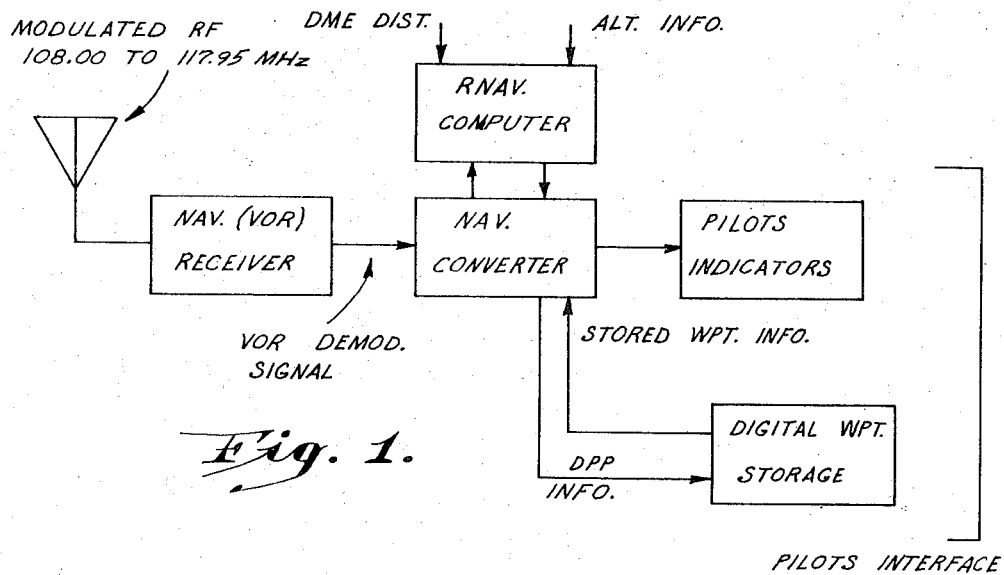
FIG. 1 is a block diagram showing the system interface including the NAV receiver, the NAV convertor, the RNAV computer, the digital waypoint storage circuitry and the pilot's indicator.

Turning now more particularly to FIG. 4, the DPP circuitry is shown therein in a block diagram. The control display unit (CDU) has been described above and operates in conjunction with the NAV converter which is remote from the DPP cirtuitry and which produces the V, R, and C signals. As further suggested, the RNAV computer will produce information which relates to the angle theta or the phase difference between the reference signal R and the variable signal V. This angle represents the position of the aircraft relative to the VOR station or the waypoint, however, the pilot is generally interested in knowing the course to the station, not from the station. Accordingly, circuitry is designed to add 180° to the theta designation. This is implemented by merely adding 180° phase shift or inverting one or the other of the signals (either the reference signal R or the variable signal V).

In FIG. 4, the NAV/RNAV converter is generally indicated by the numeral 10 and is shown as generating the three signals R, V, and C which correspond to the 30 Hz reference signal, the 30 Hz variable signal, and the 108 Khz clock signal. These three signals are inputs to a digital computation sequence generator 11 which provides the digital computation, in sequence, and takes the two 30 Hz signals V and R and produces a gate signal. This gate signal is applied to the clock signal C so that the gate is proportional to the phase difference theta plus 180°. In this manner, the clock signal C is presented for a period of time proportional to the size of the angle theta plus 180°. Accordingly, this gate is applied to the clock C to produce, in any one cycle of the 30 Hz signal R, a number of clock pulses which directly represents the desired course. Stated another way, the number of clock pulses counted in one cycle of the 30 Hz reference signal R is the gross representation of the course that is to be inserted into a memory. For example, if a course of 30° is to be inserted into a memory, the circuit causes 300 clock pulses to be gated as each clock pulse represents one-tenth of 1°.

The outputs from the digital computation sequence generator 11 include a "counter reset" which is pulsed each time a DPP calculation is ato be made thereby insuring that the counter will always start in the zero state. Also, "the DPP load" output is shown as emanating from the digital computation sequence generator 11 and will operate to inform the main CDU circuits when to load DPP information in the system. The "counter clock" output will be discussed, infra.

The counter reset output from the generator 11 is delivered to digital/analog computed load circuit 12 along with the clock output. This load circuit 12 counts the number of clock pulses coming out of generator 11 and is comprised of an up-down counter which provides the capability of counting the number of counter clock pulses and which will in turn feed a parallel to serial converter. This P/S converter is operable to take parallel inputs and to develop a serial output. The single output from the digital/analog computed load circuit 12 is the "DPP serial data" output which will be comprised of 16 bits corresponding to the computed course. These bits are multiplexed in time on one line and serially fed to the memory with data being synchronized to the internal memory circuit via the internal clock (used as a shift clock) and the internal shift register parallel to serial control line identified as the terminals "shift clock" and "S/R P/S" on the main CDU. (S/R-P/S is utilized to refer to shift register - parallel to serial.)

The DPP timing and control circuit 13 primarily operates to synchronize the DPP data with the internal memory circuits. As is shown, the DPP timing and control circuit 13 has the DPP serial data input, the DPP load input from generator 11, the internal memory synchronizing pulse from the main CDU and the DPP address also from the main CDU. The DPP address defines the slot on the main memory shift register for the insertion of the 16 bits of DPP data. The memory synch line informs the timing and control circuit 13 where the end of the main memory shift register is. The two outputs from the timing and control circuit 13 directly address the main 1,000 bit shift register so that when the DPP synchronized load line goes high, that data which appears on the DPP signal line goes directly onto the 1,000 bit shift register.

The master sequence timer 14 has four inputs and include the main input or "DPP key." This DPP key is a switch contact to ground on the front panel which the pilot pushes to initiate the DPP sequence. The next input is the "DPP enable" which operates to enable the DPP circuit only when the pilot is looking at the same information that corresponds to the present navigation problem. In other words, the displayed information is the same as the navigation parameters. There are also two NAV test inputs, a "start" and a "stop" input, so that when the pilot initiates a NAV test sequence, after a certain period of time the NAV test sequence starts the DPP operation. Additionally, if the pilot wishes, he may stop the NAV test and the DPP sequence before the conclusion of a sequence in test mode. The NAV test lines actually refer to a NAV test sequence which the pilot can go through any time he wishes to test the operation of the area navigation system.

Accordingly, the pilot has only to activate the switch labeled "NAV test" and the NAV test sequence, with several different self-test features, is initiated. Of course, the self-test feature important to the subject invention is the initiating operation of the DPP circuit to see if it is functioning properly. The master sequence timer 14 has two outputs and an additional input shown on the right hand side of the block in FIG. 4. When the pilot pushes the DPP key, an 8 second timer is fired which enables the DPP active output to the digital computation sequence generator 11. At the same time, a 3 second timer is fired which is used to inhibit the analog slew rate circuit 15 which will be described in more detail later. The DPP active line is enabled for a full 8 seconds or until the deviation bar is centered. Three seconds after the pilot pushes the DPP key, the analog gate (an output from timer 14) is enabled. This gate will be enabled from 3 to 8 seconds from the time that the pilot pushes the DPP key and will also be applied to the digital/analog up/down circuit 16.

Referring to FIG. 4a, it is noted that the DPP key causes a positive pulse to appear on the DPP active line and 3 seconds later the analog gate line is enabled. The active line and the analog gate line are simultaneously reset by either one of two different conditions. The first condition is the end of an 8 second timer. The second condition is the CDI bar coming into the centered mode which, of course, may occur before the 8 second timer runs out. This zeroing of the D-bar is detected by the analog up/down steering circuit 17.

Steering circuit 17 has two inputs, the CDI D-bar plus and minus lines which also operate to drive the CDI bar. The steering circuit 17 monitors the voltage thereto and detects it with a high impedance input. The CDI D-bar plus and minus lines should also be considered with respect to FIG. 4b where the voltage difference between the two lines is plotted versus deviation of the D-bar. In actual practice, this deviation can have three different modes; (1) the VOR mode, in which 10° represents full scale; (2) the RNAV mode in which 5 miles represents full scale; or (3) the approach mode in which 1¼ miles represents full scale.

The analog up-down steering circuit 17 converts this analog ramp into the digital lines, the up-off line or the down-off line. In other words, there are three possible conditions for the D-bar indicator, e.g. (1) the centered mode where the difference voltage is less than some pre-determined threshold voltage V in either the positive or negative direction; (2) the up condition in which a voltage difference is greater than a pre-determined threshold voltage in a positive direction; and (3) the down mode which is indicative of a condition when the difference voltage is greater than the threshold voltage but in a negative direction. In the plot shown in FIG. 4b, the V represents the respective threshold voltages for purposes of depicting the centered and the up-down operational modes.

Figure 2:
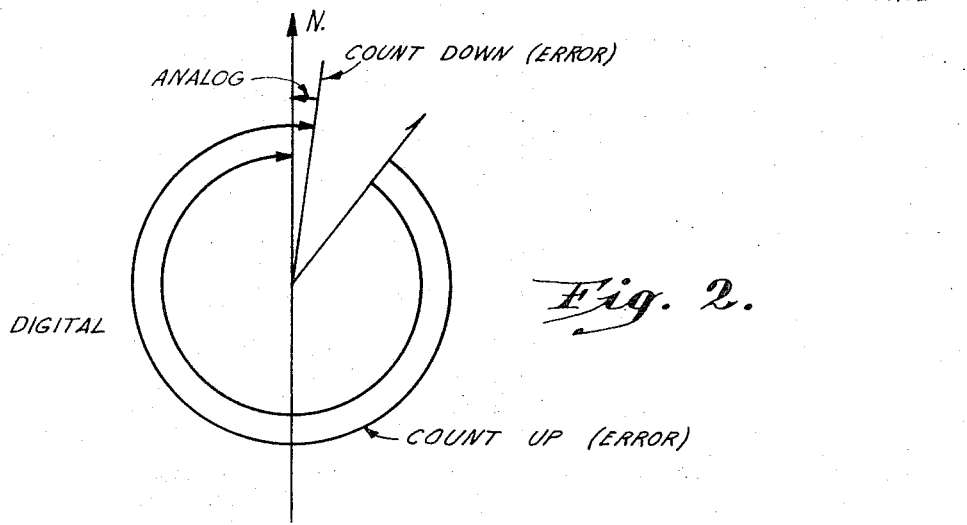
FIG. 2 is a plot showing the functional utilization of both the digital and analog counts.
Figure 3:
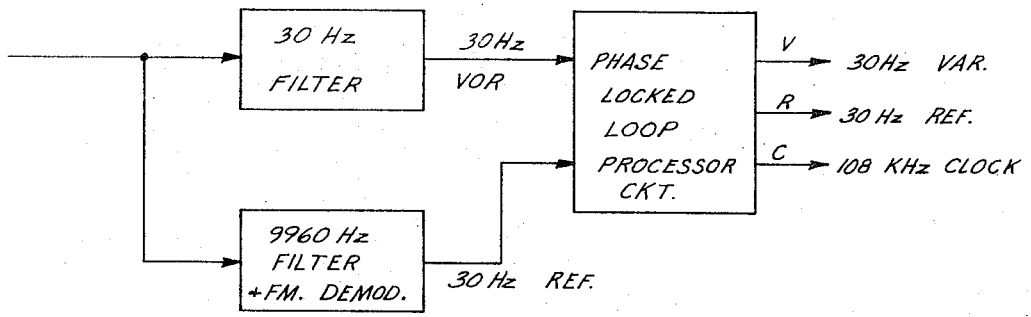
FIG. 3 is a block diagram showing the processing sections of the NAV convertor.

Referring now to the digital analog up/down circuit 16, this circuit has three inputs and two outputs. The three inputs comprise the analog gate in which the analog up/down information is gated to the counter up/down output. The other two inputs are the analog up/off the and the analog down/off inputs. The two outputs are the counter up/down line and the D-bar centered line. The mode is assumed to be digital unless the analog gate is specifically enabled to that the counter up/down circuit assumes the up mode unless the analog gate line and analog down line are both enabled. This latter condition results in the counter up/down line going into the down mode. Referring to FIG. 2, it will be noted that when in the digital mode, the counting is always up but when in the analog mode, the count may be either up or down depending on whether or not the first approximation passed our desired course.

Figure 5:
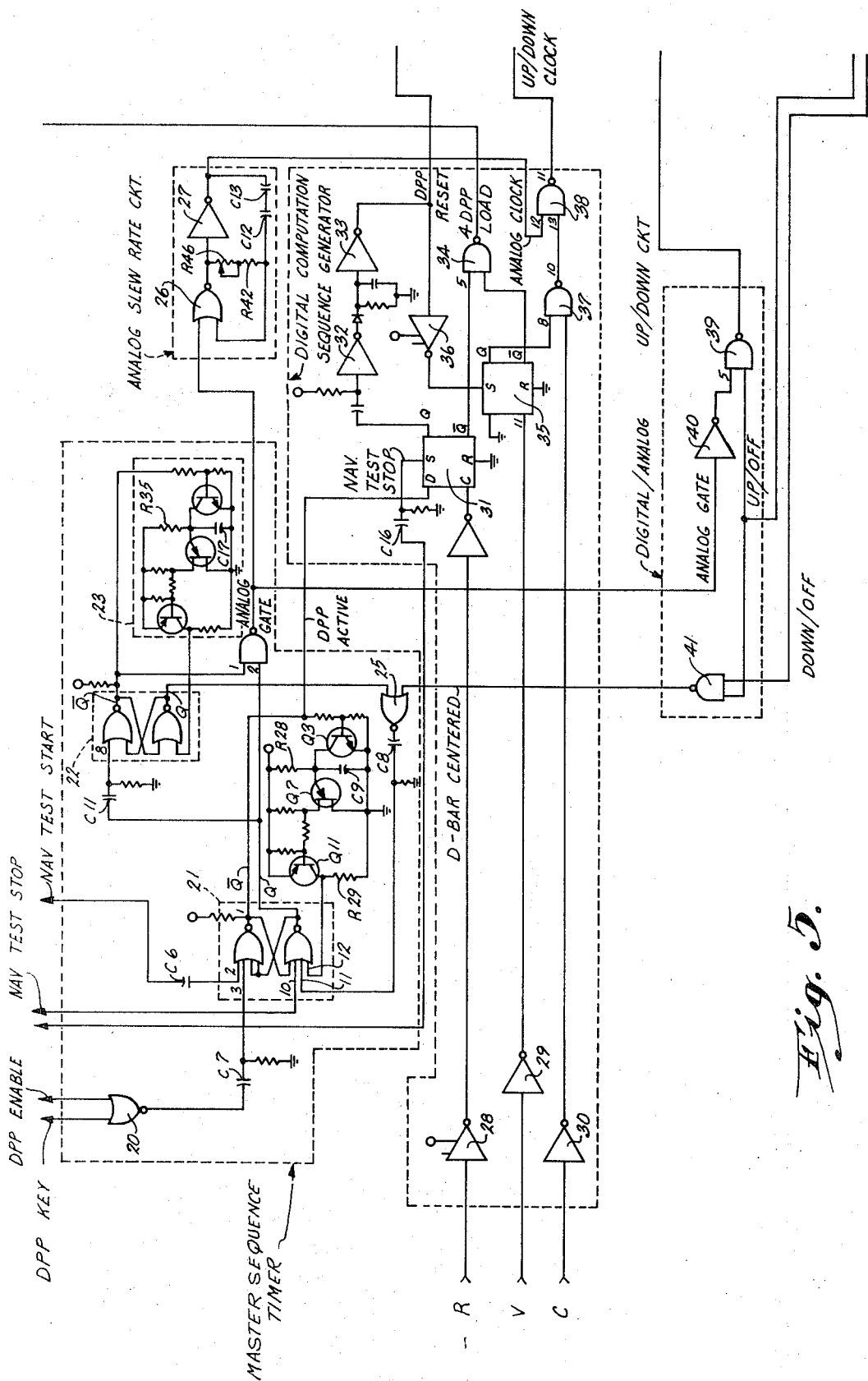
FIG. 5 is a more detailed schematic of the master sequence timer, the analog slew rate circuitry, the digital computation sequence generator, and the digital/analog up/down circuit.

FIG. 5 is a more detailed showing of the master sequence timer previously indicated by the numeral 14 in the description of the block diagram FIG. 4. As mentioned above, the inputs to the master sequence timer 14 include the DPP key, the DPP enable, and the NAV test start and stop lines as well as the D-bar center input emanating from the digital/analog up/down circuit 16. As shown on the upper left hand portion of FIG. 5, the DPP key and the DPP enable lines are directed to the input of NOR gate 20. NOR gate 20 performs an inhibit function and enables the DPP key line only under the following condition of the CDU. This condition is when the waypoint that the pilot is operating on is the same waypoint displayed on the indicator. Accordingly, if a pilot is programming information into the device corresponding to a waypoint other than that which corresponds to the current navigation problem and accidentally hits the DPP key, nothing will happen.

When the DPP enable line is high the output of the NOR gate 20 will be low regardless of the state of the DPP key line thereby performing the inhibit function. However, if the pilot is presently observing the same information that corresponds to the present navigation problem, then the DPP enable line is low so that the DPP key is then enabled. Under normal circumstances, when the DPP key line is high and the pilot has not pressed the DPP key, the output of the NOR gate 20 is still low. When the pilot presses the DPP key, this line goes low and the output of NOR gate 20 goes high. The positive transition of the output of NOR gate 20 is coupled through capacitor C7 to the set input of flip-flop 21 (either pin 2 or pin 3 of flip-flop 21 acts as a set line for same).

Flip-flop 21 and transistor stages Q3, Q7 and Q11 comprise an 8 second one shot or monostable multivibrator so that output pin 1 of flip-flop 21 goes low for 8 seconds as a function of the activation of the DPP key. The one shot output on pin 1 of flip-flop 21 is the DPP active output of the master sequence timer en route to the digital computation sequence generator 11 which will be described in more detail later.

As suggested above, the one shot (comprised of flip-flop 21 and the transistors Q3, Q7, and Q11) will have a normally off state with the output of Q (pin 1) of flip-flop 21 being high. When in this situation, transistor Q3 is turned on thereby shorting capacitor C9 to ground to prevent any charge from forming thereon. When capacitor C9 is shorted to ground, the transistor Q7 is off and the base of transistor Q11 is pulled up to the same voltage as the emitter of Q11. Therefore, transistor Q11 is off and the collector of Q11 is returned to ground. When the DPP key line is activated, or when the NAV test start line is activated, the Q output of flip-flop 21 goes low and turns off transistor Q3. This enables capacitor C9 to charge through resistor R28. These latter two elements form the main timing components of the one shot. As capacitor C9 charges, it will eventually pass through the threshold firing voltage of the unijunction transistor Q7 to thereby supply a negative pulse to the base of transistor Q11 and, accordingly, a large positive spike will appear on resistor R29. When this positive spike occurs, it is applied to a reset input (pin 12) of flip-flop 21 thereby shutting off the DPP active one shot.

Figure 6:
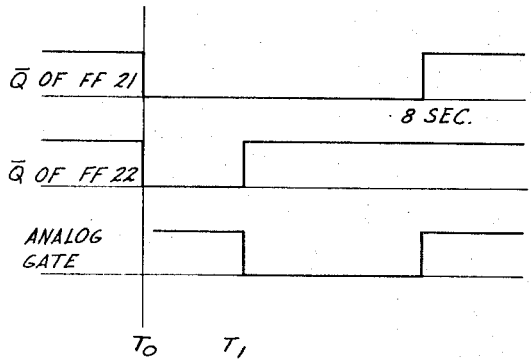
FIG. 6 is a timing diagram correlating the analog gate operation with pertinent flip-flop outputs.

As shown in FIG. 6, flip-flop 21 may be thought of as having a Q and a $\bar{Q}$ output. The Q output is coupled through capacitor C11 to the input pin 8 of flip-flop 22. When the pilot pushes the DPP key, and the Q output of flip-flop 21 goes high, the positive output edge is coupled through capacitor C11 to flip-flop 22 which then fires the one shot 23 (identical to the one shot comprising transistors Q3, Q7 and Q11 except that the timing components form the 3 second time delay rather than an 8 second time delay). This timing difference is derived from the different timing component values allocated to R35 and C17 of the one shot 23.

The above described one shot circuits form the basic timing components of the master sequence timer and also generate the analog gate. The $\bar{Q}$ output of flip-flop 22 is coupled to pin 1 of NAND gate 24. Also, the Q output of flip-flop 21 is coupled to pin 2 of NAND gate 24 so that when both inputs are high the analog gate output therefrom will go low and turn on the analog slew rate oscillator (identified by the numeral 15 with respect to the discussion of FIG. 4). When either input to gate 24 is low, the analog slew rate circuit will be turned off and the analog gate output will be high.

As seen in FIG. 6, the time $T_0$ corresponds to the time when the pilot depresses the DPP key. The analog gate is off from $T_0$ to $T_1$ which is the length of time that flip-flop 22 is low. This wait time is the analog wait time after the quick calculation referred to above in the brief description. After the time period from $T_0$ to $T_1$ has elapsed, and when the analog gate goes low, the analog slew portion of the DPP procedure begins so that the up/down counter eventually slews to a null by utilization of the CDI D-bar lines.

The D-bar centered input to the master sequence timer provides a "shut off" for same in the analog mode when the D-bar has been slewed into a null. In other words, once the bar is centered, the DPP sequence can be considered over thereby permitting the master sequence timer to be turned off.

As suggested, the voltage level on the D-bar centered line will correspond to the particular D-bar position. For example, if the voltage on this line is high, the D-bar is not centered, however, if the line voltage is low the D-bar will be considered to be centered. This input, along with the input from the Q output of flip-flop 22, is applied to NOR gate 25 so that when the one shot (formed from flip-flop 22 and timing circuit 23) has a low output, a combined low condition on the D-bar centered input to Nor gate 25 causes the output of gate 25 to go high. This high condition is coupled through capacitor C8 to pin 11 of flip-flop 21, resetting same (shutting off flip-flop 21) and returning the circuitry to a reset condition. If a null occurs before the 8 second timer completed its cycle, flip-flop 21 will be reset independently of the timer output. However, if the D-bar does not center within 8 seconds, the 8 second timer will reset the flip-flop regardless of whether or not a null is reached. Accordingly, the circuitry is prevented from running for an extended period of time if the quick computation is substantially off by a large number of degrees.

The CDU also provides a means by which the DPP sequence can be started in the NAV test mode. This is accomplished by a positive transition on the NAV test start line which is coupled through capacitor C6 to pin 2 of flip-flop 21 thereby initiating the same functions as if the pilot had pushed the DPP key. Furthermore, the DPP procedure will continue as normal in the conditions described above. However, in the NAV test mode, the pilot has the option of stopping the DPP sequence at any point. If the pilot elects to stop the DPP sequence, the positive transition on the NAV test stop is coupled directly to pin 10 of flip-flop 21 and the entire master sequence timer will be shut off.

As mentioned above, the analog gate output of the master sequence timer is delivered to the analog slew rate circuit 15 (FIG. 5). As shown in FIG. 5, the analog slew rate circuit is comprised of NOR gate 26 and inverter 27 along with capacitors C12, C13 and resistors R42, R46. This circuit arrangement forms a standard oscillator circuit which can be turned on or off depending on the state of the analog gate input line. If the input line is high, the oscillator will be off and the output of the oscillator will be in a high state. Likewise, if the input (analog gate) is low, the oscillator will be turned on and will oscillate at a rate determined by the above mentioned combined RC network. In actual practice, the analog slew rate oscillator will oscillate around 20 Hz and can be varied by changing the setting of the potentiometer R46. As a result, the entire system time constant may be changed by varying the oscillatory rate of the analog slew rate oscillator.

The system time constant referred to above corresponds to the application of a one-tenth of 1° step to the up-down counter with a time delay before that member is entered into memory. The RNAV computer is then delayed before utilizing all the data supplied thereto with yet another time delay existing before the RNAV computer applies the corrected signal to the D-bar lines. When the data is finally applied to the D-bar lines, that change is sensed and, if needed, another step will be caused depending on whether or nor a null has been reached. Each count of the analog slew rate oscillator therefore represents one-tenth of a degree applied to the RNAV computer.

The digital computation sequence generator, which was generally indicated by the numeral 11 in FIG. 4, is shown in more detail in FIG. 5. As mentioned above, the inputs to this circuit include the DPP active line (an output from master sequence timer 14), the three VOR signal inputs (30 Hz reference R; 30 Hz variable V; and 108 Khz clock) and the NAV test stop line also discussed above. When the DPP active line is high (the inactive condition) the digital computation sequence generator is off. The R, V and C signal inputs are buffered to reduce loading by the three invertors 28, 29 and 30, respectively.

The positive going edge of the 30 Hz reference signal R will clock the Q output of flip flop 31 to whatever level is present on the data input pin D. Also, the $\bar{Q}$ output is simultaneously transmitted from the flip-flop 31 as will be discussed. When the DPP active input is high, the clocking results in a high level output on the Q output terminal and a continuously low level on the $\bar{Q}$ output terminal. With the constant high level on the Q output of flip-flop 31, a one shot composed of gates 32 and 33 will have a high output (e.g., the output of gate 33 will be high). Also, with the $\bar{Q}$ output being low and applied to input pin 5 of NAND gate 34, the output on pin 4 thereof will continuously be high. The 30 Hz variable signal V is applied to the input pin 11 of flip-flop 35 and operates to clock a low condition to the Q output thereof since the data input is tied to ground.

When the pilot pushes the DPP key, or switch, the DPP active line will go low for 8 seconds. On the first positive transition of the 30 Hz reference signal R flip-flop 31 will clock a low output on the Q output terminal thereby firing the one shot, comprising gates 32 and 33, and presenting a 2 microsecond negative pulse on the DPP reset output of the digital computation sequence generator. The negative pulse (of a 2 microsecond duration) is inverted by invertor 36 and applied to the set input of flip-flop 35. When this pulse (now positive) is applied thereto, the Q output of flip-flop 35 goes high. This high condition is applied to input pin 8 of NAND gate 37 thereby enabling the 108 Khz clock signal C which then appears at the up/down clock output of the digital computation sequence generator until a negative transition occurs on the 30 Hz variable (V) input thereby clocking flip-flop 35 back to the low state, shutting off gate 37 and preventing the clock from being presented as the up/down clock output. Under these conditions, the up/down clock output goes to a low condition.

Figure 7:
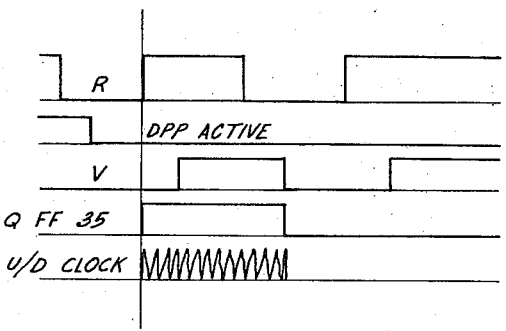
FIG. 7 is a timing diagram correlating the reference variable and clock signals with pertinent flip-flop outputs and the DPP active line.
Figure 8:
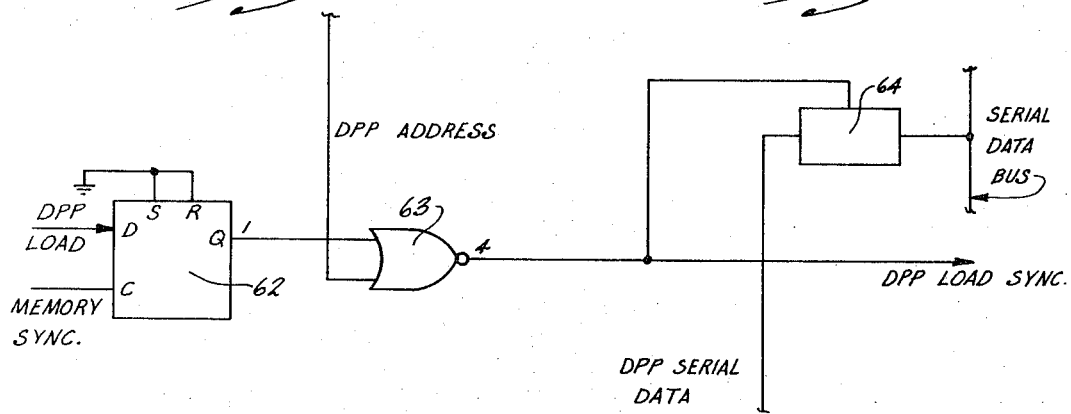
FIG. 8 is a more detailed schematic diagram of the DPP timing and control circuit.

Referring now to FIG. 7, the timing relationship between the two 30 Hz signals R and V and the clock C may be seen therein. For example, the positive edges of signal R causes the Q output of flip-flop 35 to go to the high state and to remain high until the negative edge of signal V resets the Q output to a low state. Therefore it may be seen that as the phase of the 30 Hz variable signal V is shifted relative to the reference signal R, the Q output of flip-flop 35 will change in duration and that duration change will be directly proportional to the phase difference. Further, the up/down clock will be on for a time that is exactly proportionally equivalent to the time period that the Q output of flip-flop 35 is high. Therefore, the number of pulses out of the up/down clock corresponds to the number of degrees which are being computed. For example, a hundred gated clock pulses correspond to 10°. Also it is seen that the Q output of flip-flop 35 can have a duration that may vary from 0 to 1 full cycle of the 30 Hz reference signal R.

The digital computation sequence generator also has an input from the analog slew rate circuit 15 (FIG. 4) which is referred to as the analog clock. The analog clock, in the analog mode, is transmitted to the up/down clock output so that a slow clock will be seen by the up/down counter thereby enabling the counter to be stepped up or down at a slow rate in the analog mode. In any event, the analog clock is applied to the input pin 12 of the NAND gate 38.

As suggested above, NAND gate 34 receives the $\bar{Q}$ output from flip-flop 31 and the $\bar{Q}$ output from flip-flop 35. This NAND gate generates the DPP load signal which instructs the memory that data is ready and can be read at any time. The primary purpose of the gate (34) is to prohibit the reading in of data when in a transitory state such as would occur whenever the up/down clock is transmitting the 108 Khz clock C and the up/down counter is in a fast mode. Any number written in during these conditions will be read as an error. The DPP load output is low only when the $\bar{Q}$ output of flip-flop 31 is high and when the $\bar{Q}$ output of flip-flop 35 is high. If either of flip flops 31 or 35 has a Q output which is low, a high condition will appear on the DPP load output thereby precluding data from being loaded into memory.

A NAV test stop input is also available to the digital computation sequence generator and is applied (in the form of a positive pulse) through capacitor C16 to the set input of flip-flop 31. This pulse turns off the digital computation sequence generator regardless of the state of the V or the R signals and is utilized only in the NAV test mode described above.

The digital analog up-down circuit is shown in FIG. 5 and will include the up/off and the down/off inputs from the analog up/down steering circuit 17 mentioned with respect to FIG. 4. A zero or low condition on the up input indicates that a count must be up to center the D-bar indicator. A low level on the down input indicates that the count has to be down to center the D-bar in the analog mode. The analog gate input informs the circuit as to whether or not the operation should be in the analog mode or in the digital mode. When in the digital mode, the analog gate line is high thereby forcing the output of the digital/analog up/down circuit to a high condition indicating an up count.

When the analog gate line is low, this condition corresponds to the analog mode and the decision must be made as to whether the count should be up or down depending on the state of the D-bar indicator. Gate 39 is enabled through invertor 40 when said low condition exists on the analog gate line. When input pin 5 of gate 39 is high (indicating an analog mode) the analog up line and the condition thereon is therefore significant. For example, if the up line is low then the output of gate 39 is high and the up-down counter will count up. However, if the up input is in a high state then the output of gate 39 will be low and the up-down counter will count down. As shown in FIG. 5, the two inputs from the analog up/down steering circuit indicated as shown down/off and up/off are applied to the inputs of NAND gate 41. This gate makes the decision as to whether or not the D-bar is centered. If either the up input or the down input is low then the D-bar indicator is not centered and the output of gate 41 will be high (a low or zero condition indicating that the D-bar is centered). However, if both the up and down inputs are high and the D-bar is centered, the output of gate 41 goes low indicating the centered condition and with same being transmitted to the master sequence timer as an input to the above mentioned gate 25.

Figure 10:
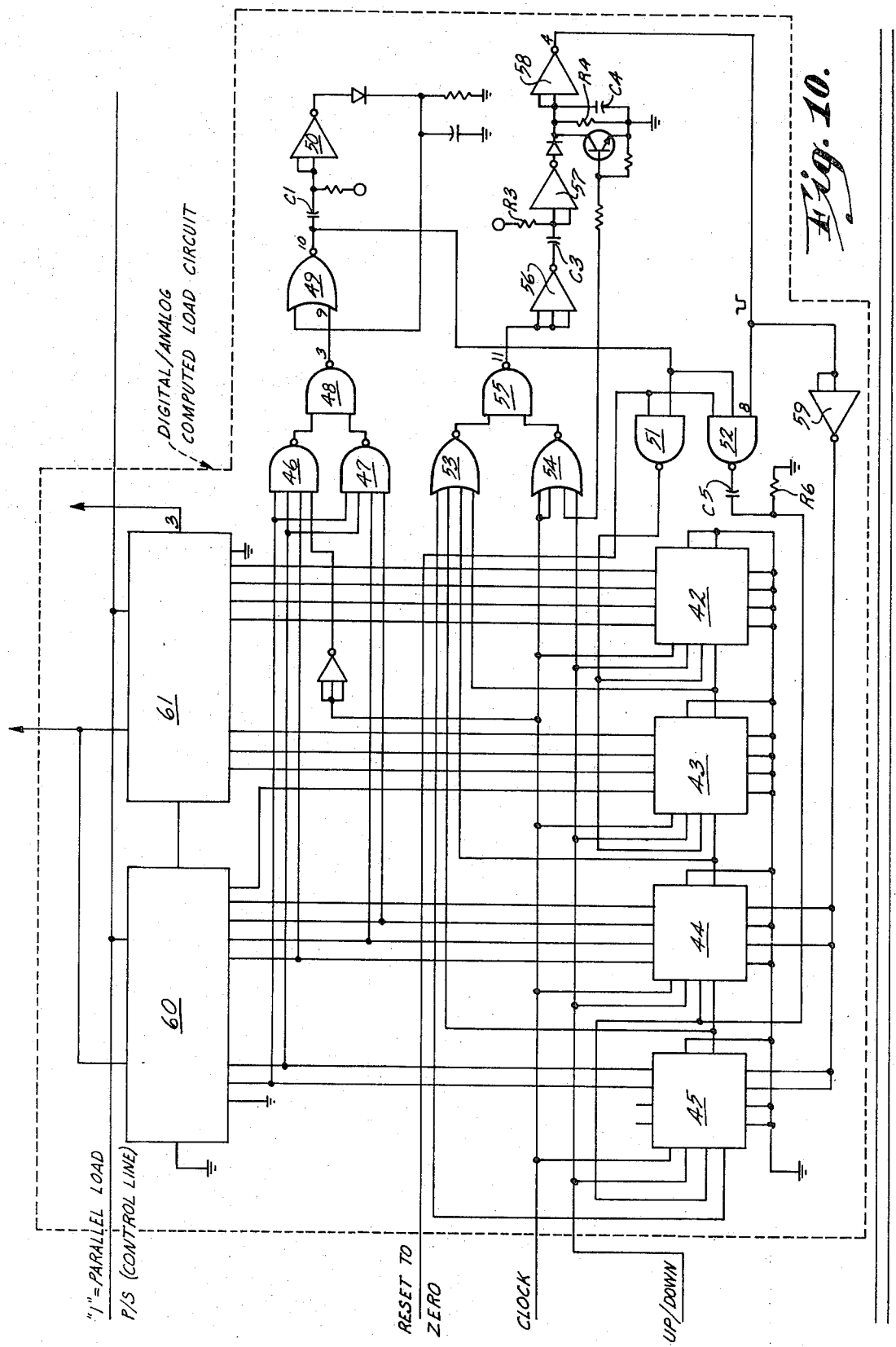
FIG. 10 is a detailed schematic view of the digital/analog computed load circuit.

The digital/analog computed load circuit indicated by the numeral 12 with respect to FIG. 4 is shown in more detail in FIG. 10. This circuit is comprised of two primary elements, the first being a modulo 360° up-down counter and the second section being comprised of a 16 bit static shift register which is controlled by the main memory circuits in the CDU. The up-down counter includes counters 42, 43, 44 and 45 which are of the decade type having a modulus of $10^4$ or 10,000. Since the counter capacity must be capable of 360°, counter 42 will correspond to one-tenth of a degree count.

When the counter reaches the 360.0° state it will be reset to zero by the monitoring of the output lines of counters 44 and 45 with the NAND gates 46 and 47. The outputs of the NAND gates 46 and 47 are applied to NAND gate 48 so that as the counter counts up to the 360.0° state, the output pin 3 at gate 48 makes a transition from the low to the high state. This transition is applied to the input pin of NOR gate 49, the output of which is coupled through capacitor C1 to the input of invertor 50. The combination of the NOR gate 49 and the invertor 50 forms a one shot which acts to "stretch" the pulse appearing at the output of gate 48 to insure that all counters reset fully to zero. The one shot comprising NOR gate 49 and intertor 50 has an output at pin 10 on the NOR gate 49 which is coupled to the inputs of the NAND gates 51 and 52. When these NAND gates (51 and 52) have a negative input transition from NOR gate 49, each NAND gate applies a positive pulse to two of the up-down counters. For example, NAND gate 51 resets counters 42 and 43 while NAND gate 52 resets counters 44 and 45. Once all counters are reset to zero, the updown counter then begins counting up from zero in the manner described above to accomplish the modulo of 360° in the up mode.

In the down mode, substantially the same function is accomplished by sensing the zero condition on all four counters and presetting all counters to the 359.9° state. The zero condition is detected by the two NOR gates 53 and 54 and NAND gate 55 so that when the counters reach the "all zero" condition while counting down, the output pin 11 of gate 55 goes low. This low condition is coupled to the input of invertor 56, the output of which is coupled to the input of invertor 57 through capacitor C3. Invertor 57 and capacitor C3 form the input stage of another pulse stretcher one shot with the output stage of same being the invertor 58. The timing components for the above one shot include the R3, C3 combination and the R4, C4 combination. Both of the time constants must time out before the one shot repeats itself.

The output pin 4 of invertor 58 is coupled to the input pin 8 of NAND gate 52 and the input of invertor 59 which is so arranged and connected with the counters 44 and 45 so that a 5 and a 3 will be preset thereon respectively when invertor 58 has a low output. Stated another way, the counters 44 and 45 are so interconnected with invertor 59 that a three will be set on the counter 45 and a five set on counter 44 before the next clock pulse. After reaching a zero condition, counters 44 and 45 are preset to the five and three states however counters 42 and 43 will have a natural transition from the zero to the nine state with the next clock pulse and do not need to be preset. The output of gate 52, which presets counters 44 and 45 to the five and the three, must be coupled through differentiating circuit C5 and R6 in order that the preset input disappears before the data disappears else the data will not be picked up by the counters.

The inputs to the digital/analog computed load circuit (see FIG. 10) are the "reset to zero" input V, the "clock" input, and the "up/down" input from the digital/analog up/down circuit. At the beginning of the DPP sequence, the "reset and zero" line will have a negative (or low) pulse thereof with an approximate 2 microsecond duration. This pulse is coupled through gates 51 and 52 to clear the counter to a zero condition. In the digital mode, the up line will be high indicating an up count and the clock input (from the digital computation sequence generator) will be delivered to the counter so that the up/down counter will then count the number of pulses coming in on the clock line and be stopped in a state corresponding to the number of pulses counted during the particular time interval. It may then be seen that the up/down counter will now contain the number of pulses corresponding to the desired computed course to waypoint.

The data pertaining to the new computed course to the waypoint must now be stored into a memory. This is accomplished with the aid of shift registers 60 and 61 which are controlled by the main timing circuits of the control display unit (CDU). Each of these shift registers is a "parallel to serial" convertor in which the parallel inputs are taken directly from the up/down counter as shown in FIG. 10. When the main memory circuits are in condition to have DPP information loaded therein, the shift registers 60 and 61 are preset with high pulse condition on the parallel/serial control line. This high exists only for a short period of time and only to accomplish the loading of the shift register stages with parallel date. Once the data is loaded, it is then clocked out serially at pin 3 of shift register 61 as the two registers are clocked with a clock input from the main CDU.

The DPP timing and control circuits operate to properly load the DPP serial data into the memory once it is understood where it is supposed to go in the memory. The inputs to this DPP timing control circuit are the DPP load line and the master waypoint sync line (which synchronizes the DPP load line with the main waypoint memory unit). The net effect of the above is that if the pilot pushes the DPP key button, the DPP circuitry goes through the calculations and the up/down counter provides the correct course while the shift register provides the serial data. In this manner, when DPP address occurs the serial data is ready to be loaded into the memory. Each time the master waypoint sync occurs, the DPP load is shifted to the Q output of flip-flop 62. If the DPP load is low this enables NOR gate 63. Once this gate is enabled, each time the DPP address occurs a high pulse will appear on pin 4 of gate 63. This output is applied to the control input of gate 64 which connects the DPP data with the main serial data bus. Once this occurs, the DPP data is loaded directly into the memory from shift registers 60 and 61 described above. Simultaneously, when the DPP data is loaded into memory, the output at pin 4 of gate 63 inhibits the refresh of course data in the main CDU. DPP information will continue to be loaded into the memory as long as the DPP load line into flip-flop 62 is low so that as the up/down counter is stepped in the slow slew mode, up or down, as the case may be the memory will continue to refresh itself with new data each time the up/down counter steps.

Figure 9:
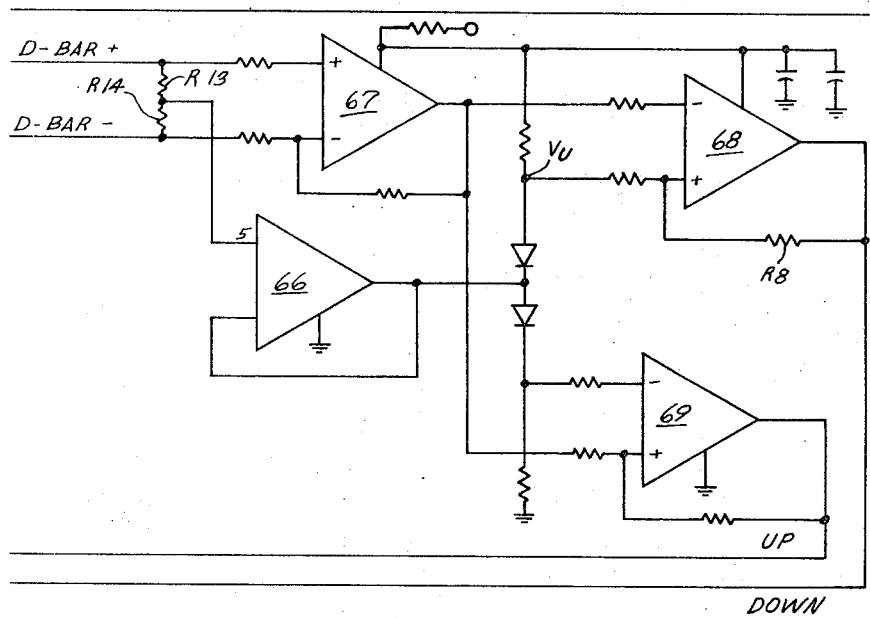
FIG. 9 is a more detailed schematic diagram of the analog up/down steering circuit.

FIG. 9 diagramatically shows the analog up/down steering circuit having inputs thereto which are the D-bar plus and D-bar minus lines. These lines are taken directly from the deviation bar and are possessed to derive the up and down logic level outputs for bar position and movement. Resistors R13 and R14 form a reference circuit which detects the average of the two voltages on the input from the D-bar plus and minus lines. The center tap between the two resistors is applied to pin 5 of the up amplifier 66 which operates in the unity gain mode as a current buffer. The D-bar plus and minus inputs are applied differentially to the plus and minus inputs of the amplifier 67 which amplifies the difference in voltage therebetween. The output pin 1 of the amplifier 67 is applied to the minus input of the operational amplifier 68 and simultaneously to the plus input of the operational amplifier 69. Operational amplifier 68 senses when the output of amplifier 67 is greater than the output of amplifier 66 and operational amplifier 69 senses when the output of amplifier 67 is less than the output of amplifier 66. The threshold (for direction) of operational amplifiers 68 and 69 is the output of operational amplifier 66 plus or minus one diode voltage drop of approximately seven-tenths of a volt. Operational amplifier 68 and 69 operate as switches so that when the output of operational amplifier 67 goes past the (upper) threshold $V_u$, the output of the operational amplifier 68 will then make a transition from high and low. In addition, resistor R8 provides positive feedback to prevent oscillations about the threshold $V_u$. Operational amplifier 69 operates in the same manner only in the opposite direction, hence a decision circuit is provided to inform the circuit whether or not the D-bar is outside of the present range of voltage.

The centered condition occurs when both operational amplifiers are in the high state meaning that the operational amplifier 67 output is between the two threshold voltages $V_L$ and $V_u$. This is a centered condition. The up condition is when the output of operational amplifier 67 is greater than $V_u$ and the down condition occurs when the output of operational amplifier 67 is less than $V_L$.

From the foregoing, it will be seen that this invention is one well adapted to attain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. An avionics apparatus for assisting in the navigation of an aircraft using the VOR station or RNAV way point information, said apparatus comprising
   means for receiving said VOR information,
   means for producing a reference phase signal (R) and a variable phase signal (V),
   means for digitally producing information corresponding to the present position of said aircraft relative to said VOR station or RNAV way point, said last mentioned means utilizing said R and V signals for said digital production, said apparatus including a course deviation indicator (D-Bar)
   means for determining if said D-Bar is centered,
   means for storing said digitally produced information, and
   means for utilizing said stored digital information to assist in effecting the centering of said D-Bar.

2. The combination as in claim 1 including means for producing a clock signal (C), said digital producing means utilizing said V, R and C signals to produce present position information.

3. The combination as in claim 2 including means for counting said clock pulses within a preselected time period, said total number of clock pulses being related to the present position of said aircraft with respect to said VOR station or RNAV waypoint.

4. The combination as in claim 1 including analog means to effect the final centering of said D-bar to correspond to said present position of said aircraft.

* * * * *

UNITED STATES PATENT OFFICE
CERTIFICATE OF CORRECTION

Patent No. 3,838,427      Dated September 24, 1974

Inventor(s) Edward J. King, Jr.; Kenneth R. Ganther, Jr.; Ronald Eugene Grillot

It is certified that error appears in the above-identified patent and that said Letters Patent are hereby corrected as shown below:

Col. 2 -- Line 3  - "is" (second occurrence) should be --it--.
Col. 2 -- Line 8  - "is" should be --are--.
Col. 2 -- Line 18 - "NAC" should be --NAV--.
Col. 3 -- Line 14 - "potentiameters" should be --potentiometers--.
Col. 3 -- Line 25 - "specifications" should be --specification--.
Col. 3 -- Line 63 - "cirtuitry" should be --circuitry--.
Col. 4 -- Line 33 - "ato" should be --to--.
Col. 5 -- Line 59 - "impedence" should be --impedance--.
Col. 6 -- Line 21 - "the" (first occurrence) should be deleted.
Col. 6 -- Line 24 - "to" should be --so--.
Col. 8 -- Line 12 - "Nor" should be --NOR--.
Col. 11 - Line 33 - "intertor" should be --invertor--.
Col. 13 - Line 13 - "possessed" should be --processed--.
Col. 13 - Line 34 - "amplifier" should be --amplifiers--.

Signed and sealed this 3rd day of December 1974.

(SEAL)
Attest:

McCOY M. GIBSON JR.
Attesting Officer

C. MARSHALL DANN
Commissioner of Patents